July 24, 1962  F. P. SUMMERS, JR., ET AL  3,046,556
INK SUPPLYING MEANS FOR THE PENS OF RECORDING METER APPARATUS
Filed Feb. 29, 1960 2 Sheets-Sheet 1

July 24, 1962    F. P. SUMMERS, JR., ETAL    3,046,556
INK SUPPLYING MEANS FOR THE PENS OF RECORDING METER APPARATUS
Filed Feb. 29, 1960    2 Sheets-Sheet 2
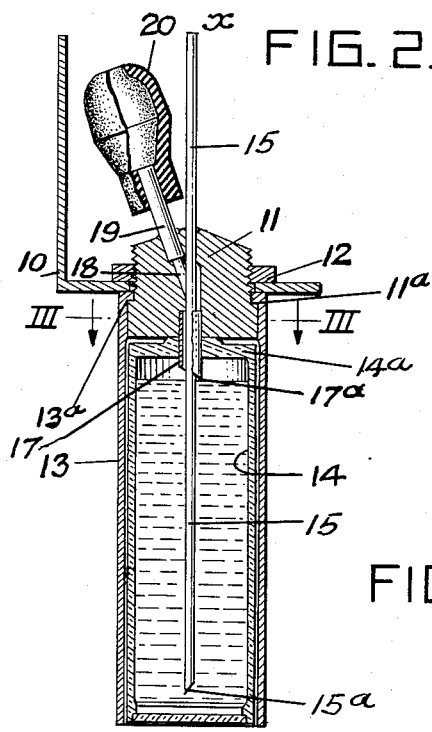
FIG. 2.
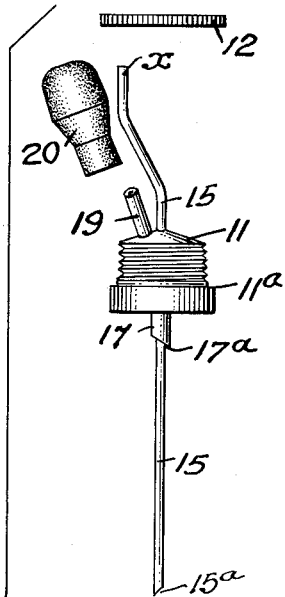
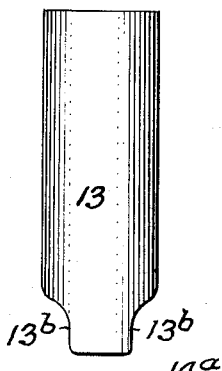
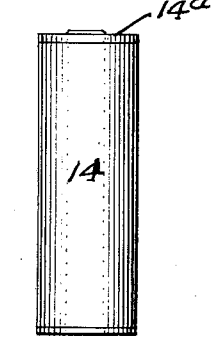
FIG. 4.
FIG. 3.

United States Patent Office 3,046,556
Patented July 24, 1962

3,046,556
INK SUPPLYING MEANS FOR THE PENS OF RECORDING METER APPARATUS
Frank P. Summers, Jr., Medford Township, Burlington County, and Russell E. Mattson, Pennsauken, N.J., assignors to The Esterbrook Pen Company, Camden, N.J., a corporation of New Jersey
Filed Feb. 29, 1960, Ser. No. 11,714
8 Claims. (Cl. 346—140)

This invention relates to means for maintaining a supply of ink for and delivering the same to the pens of recording meter apparatus and the manner in which such ink supply is supported in operative position with respect to the record sheet of such apparatus for subsequent delivery of ink to the pens.

Recording meter apparatus is usually mounted in a cabinet containing the chart upon which the desired data is recorded, such chart being frequently in the form of a rotating disk although it is common to employ record sheets movable in a horizontal or vertical direction also. The driving means for such chart imparts movement thereto for various time intervals. Pivotally mounted pens for marking the chart or record sheet are mounted within the cabinet and may be connected to a siphoning tube comprising a conduit for the passage of ink from an ink supply supported within the cabinet.

The present invention relates to the ink supply assembly and the means whereby replenishment of such ink supply may be affected in a simple and most efficient manner.

A further object of the invention is to provide the ink supply in the form of an ink-containing cartridge having one end closed by a puncturable diaphragm; such cartridge being supported in a suitable manner and may be removed from its support when empty; followed by the insertion of a fresh cartridge containing a fresh supply of ink without disturbing in any way any part of the cartridge support or any of the elements which make up the complete metering apparatus.

And a further object of the invention is to provide efficient puncturing means for piercing the closed end of the cartridge as it is set in place whereby the passage of ink therethrough to the pens or the conduit leading to the pens is not interrupted during the positioning of a new cartridge with a fresh supply of ink.

These and other features of the invention are more fully pointed out hereinafter; reference being had to the accompanying drawings, more or less diagrammatic in character, in which:

FIG. 2 is a sectional view of the ink supply assembly in the operative position.

FIG. 3 is a cross sectional view on the line III—III, FIG. 2.

FIG. 4 is a view of the parts of the ink supplying means in the separated condition.

Figure 1:
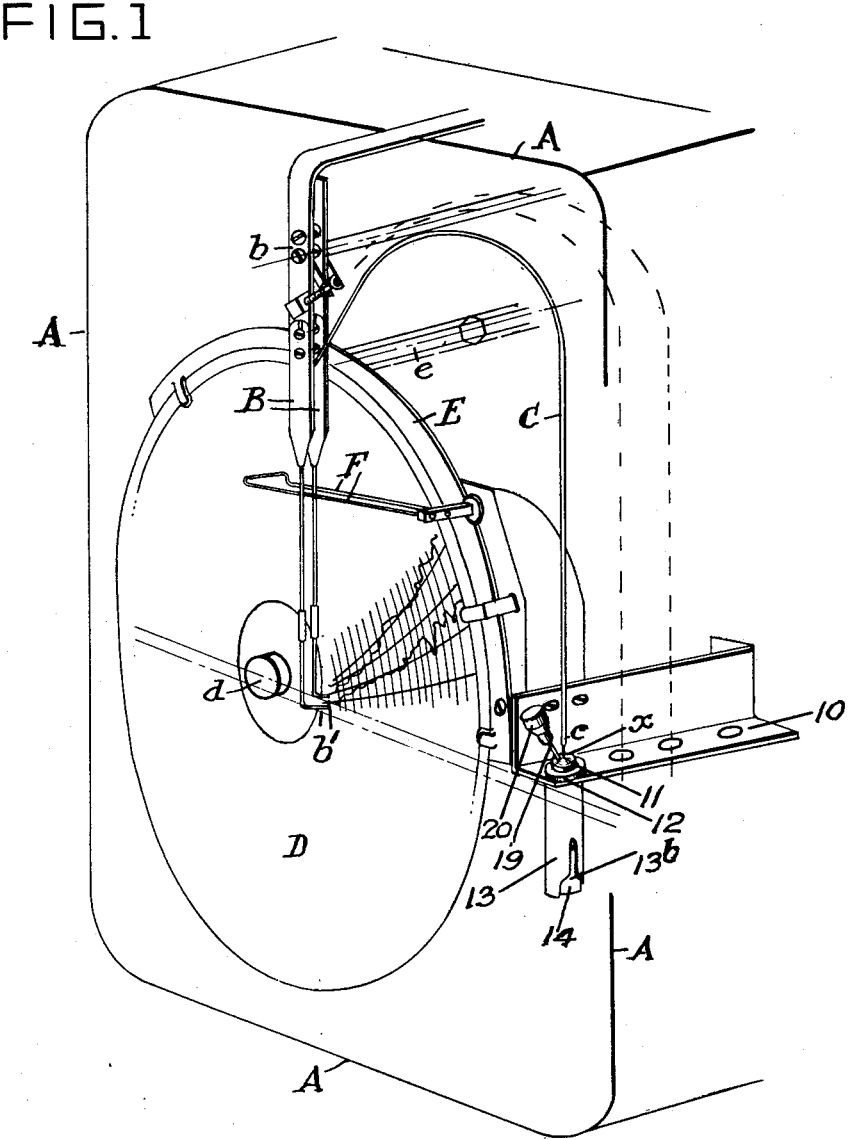
FIGURE 1 is a phantom view, wholly diagrammatic, of one form of recording meter apparatus showing the relation and position of the ink supplying means for the same.

Referring to the drawings and more particularly to FIG. 1, which is wholly diagrammatic, the broken lines indicated at A represent the general shape and proportions of a cabinet designed to house the elements of the recording meter apparatus. The pens are shown at B, and are pivotally mounted at $b$; their marking ends being indicated at $b'$. A non-stretchable flexible tube for the conveyance of ink to the pens by siphonic action is shown at C; the lower end of such tube terminating at the point $c$. This tube C may be of "Saran" plastic, a trademark of the Dow Chemical Company for a series of vinylidene chloride copolymers.

One form of chart upon which the desired data is traced by the pens is shown at D, and in the present instance this chart is circular and is mounted for rotation on the axis $d$. A guard E may be employed to engage the edge of the chart and insure that it moves in a single plane, and this guard may be supported by the post or rod $e$. The pens pass between pivotally mounted fingers F which are employed to move the pens away from the face of the chart when it is to be removed and a fresh chart inserted.

To the right of the diagrammatic view illustrated in FIG. 1 in proper relative position with respect to the marking ends of the pens, the ink supply assembly is mounted. Suitably arranged and supported within the cabinet is a shelf or bracket 10, which may be arranged to be vertically adjustable; such shelf or bracket having a horizontal portion supporting the ink supply assembly. Inasmuch as they are all alike, only one assembly is illustrated, but it will be understood that provision is made for the shelf or bracket 10 to support four ink supply assemblies which may be connected to four pens.

Carried by the shelf or bracket 10 is a cap member 11, which is secured in place by a nut 12; such cap member 11 supporting an open bottom shell 13 for receiving an ink-containing cartridge 14. The shell has an inturned flange $13^a$ at its upper end which is confined between the under side of the shelf or bracket 10 and a shoulder $11^a$ on the cap member 11 whereby tightening of the nut 12 also secures the shell in place. The shell adjacent its bottom open end is notched at $13^b$ at opposite sides so that the cartridge may be viewed and its contents checked, and these notches facilitate insertion of the cartridge. The cartridge is made of a suitable plastic body—polyethylene, for instance—and when it is mounted in the shell 13 it is frictionally held therein at its upper end, as will be more fully described.

The upper end of the cartridge is closed by a puncturable diaphragm $14^a$ which is to be pierced so that the contents of the cartridge may be delivered to the pens. Carried by and extending axially through the cap member 11 in fixed axial position with respect thereto is a metal capillary tube 15 terminating at its upper end at the point $x$ disposed well above the cap member, where it may be connected to the end $c$ of the tubular conduit C, and having at its lower end a cutting edge $15^a$. When the cartridge is set in place in the shell 13, this diaphragm meets the cutting edge $15^a$ of the tube 15 and is pierced thereby; thus placing the contents of the cartridge in communication with the conduit C leading to the pen. The diaphragm is preferably recessed centrally to guide its contact with said cutting edge $15^a$. In order to insure complete emptying of the cartridge, the lower cutting edge 15a extends substantially to the bottom of the cartridge when the latter is in operative position as shown in FIG. 2.

The bore of the cap member 11 tightly receives the capillary tube 15 in its upper end portion, but is slightly enlarged throughout its lower end portion, and this bore enlargement fixedly receives the upper end of a short-length, larger-diameter tube 17 which encircles the capillary tube and depends a short distance from the under face of the cap member 11 and thus into the cartridge interior when said cartridge is mounted as in FIG. 2. The short tube 17 terminates at its lower end in a cutting edge $17^a$ which is adapted to cut its own hole through the cartridge diaphragm $14^a$, which hole will of course be one in enlargement of the hole through which the capillary tube 15 previously passed. Consequent to the substantial frictional grip which the material of the diaphragm defining the hole made by the cutting edge 17ª exercises on the outer peripheral surface of the short tube 17, said latter tube serves as the sole means for securing the cartridge in place against the cap member 11 and within the shell 13.

The annular space between the capillary tube 15 and the short tube 17 provides communication between the cartridge interior and the upper end of the aforesaid enlarged bore of the cap member. The cap member 11 has a vent opening 18 in communication with the enlarged bore end and thereby with the cartridge interior through the bore of the short tube 17, and this opening 18 receives an inclined tube 19 to which a venting and squeeze bulb 20 is attached whereby pressure may be applied to the contents of the cartridge to insure flow of ink to the pen and to clear out any bubbles of air that may form in the conduit C through which ink is conveyed to the pen.

While features of this invention are shown in the drawings and described in the specification with some degree of specific construction, it will be understood that such illustration and description are for illustrative purposes only and not as limiting the invention in any manner since modifications and changes may be made within the spirit thereof; all of which is deemed to be within the scope of the appended claims.

We claim:

1. Ink supply means for a recording pen comprising a fixed cap member, an ink-containing cartridge coaxial therewith and having a puncturable diaphragm closing the end of the cartridge disposed adjacent the cap member, a rigid tube of capillary dimensions extending axially through the cap member and having fixed axial position with respect thereto, the lower end of said tube having a cutting edge for piercing said diaphragm and extending substantially to the bottom of the cartridge when said cartridge is in operative position against the cap member, the upper end of said tube extending beyond the cap member and providing an ink outlet from the cartridge interior to the pen, a short-length, larger-diameter rigid tube encircling the first tube and being affixed to the cap member and depending therefrom a short distance into the cartridge interior, the lower end of the short tube having a cutting edge for piercing a hole in the diaphragm in enlargement of the hole therein for the first tube, said short tube frictionally and detachably securing the cartridge in operative position aforesaid, and means on said cap member in communication with the bore of said short tube for venting the cartridge and applying positive pressure to the ink content thereof, the construction and arrangement being such that the cartridge is mounted and rendered operative by moving it with its end diaphragm disposed towards the under side of the cap member against said member, which in turn results in the cutting edges of the first and short tubes successively puncturing said diaphragm and thereby establishing communication between the cartridge interior and said tube bores and between said cartridge interior and said vent and pressure means and securing the cartridge in operative position to the cap member.

2. Ink supply means for a recording pen as set forth in claim 1, wherein said cap member mounts an open-bottom shell providing a guide for the cartridge in its movement against the cap member and a protective enclosure for the cartridge when the latter is in its operative position as aforesaid.

3. Ink supply means for a recording pen as set forth in claim 2, wherein said shell is notched adjacent its open-bottom end to provide a cartridge-viewing opening.

4. Ink supply means for a recording pen as set forth in claim 1, wherein the cap member is provided with a through bore having a smaller-diameter upper end in which the first tube has tight fit and a larger-diameter lower end in which the upper end of the short tube similarly has tight fit, and wherein said venting and pressure-applying means is connected to the larger-diameter bore above the short tube.

5. In recording apparatus having a pen mounted for movement over a record-receiving surface and adapted to receive ink from a capillary tubing, ink supply means comprising a support carried by a fixed part of said apparatus, a cap-form member rigidly affixed to said support, a hollow, open-bottom shell affixed to said member in coaxial relation therewith, an ink-containing cartridge extending into said shell and being removably secured to said member, a rigid tube of capillary dimensions extending axially through the cap member and having fixed axial position with respect thereto, the upper end of said tube providing an ink outlet from the cartridge to which said capillary tube is connected, and the lower end of said tube extending into the cartridge and terminating near the bottom thereof in a cutting edge, a short-length, larger-diameter, rigid tube encircling the first tube and being affixed to the cap member and extending therefrom a short distance into the cartridge interior, the lower end of said short tube also terminating in a cutting edge, means including said short-length tube for venting and applying pressure to the interior of the cartridge, at least the central portion of the end of the cartridge adjacent the cap member being formed of readily puncturable material, the construction and arrangement being such that the cartridge is mounted in operative position by inserting same into the shell and forcing it against the cap member, as effects initial piercing of said puncturable material by the cutting edge of the first tube and an enlargement of said puncture by the cutting edge of the shorter tube, and further effects detachable securement of the cartridge to the short tube by friction of the puncturable material on the outer surface of said short tube.

6. Ink supply means for a recording apparatus as defined in claim 5, wherein said venting and pressure-applying means comprises a squeeze bulb mounted on the cap member in communication with the interior of the cartridge via the bore of said short tube.

7. Ink supply means for a recording apparatus as defined in claim 5, wherein the shell is provided adjacent its open bottom with oppositely disposed notches providing cartridge-viewing openings and further facilitating movement of the cartridge into and out of the shell.

8. Ink supply means for a recording pen comprising a fixed cap member adapted for operative association with an ink-containing cartridge in coaxial relation therewith and the cartridge having a puncturable diaphragm closing the end thereof adapted to be disposed adjacent the cap member, a rigid tube of capillary dimensions extending axially through the cap member and having fixed axial position with respect thereto, the lower end of said tube having a cutting edge for piercing a diaphragm of a cartridge and said tube adapted to extend substantially to the bottom of the cartridge when a cartridge is in operative position against the cap member, the upper end of said tube extending beyond the cap member and providing an ink outlet from a cartridge interior to the pen, a short-length, larger-diameter rigid tube encircling the first tube and being affixed to the cap member and depending therefrom to extend a short distance into a cartridge interior, the lower end of the short tube having a cutting edge for piercing a hole in the diaphragm in enlargement of the hole therein for the first tube, said short tube adapted to frictionally and detachably secure a cartridge in operative position, and means on said cap member in communication with the bore of said short tube for venting a cartridge and applying positive pressure to the ink content thereof, the construction and arrangement being such that a cartridge can be mounted and rendered operative by moving it with its end diaphragm disposed towards the under side of the cap member against said member, which in turn results in the cutting edges of the first and short tubes successively puncturing the diaphragm and thereby establishing communication between the cartridge interior and said tube bores and between the cartridge interior and said vent and pressure means and securing a cartridge in operative position to the cap member.

References Cited in the file of this patent

UNITED STATES PATENTS

| | | |
|---|---|---|
| 2,140,257 | Butler | Dec. 13, 1938 |
| 2,792,969 | Anderson | May 21, 1957 |
| 2,800,385 | Cannon | July 23, 1957 |
| 2,820,689 | Holloway | Jan. 21, 1958 |

FOREIGN PATENTS

| | | |
|---|---|---|
| 21,142 | Great Britain | 1899 |